Feb. 16, 1926.
E. M. ROSENBLUTH
1,573,578
AUTOMOBILE ACCESSORY
Filed Nov. 22, 1921
6 Sheets-Sheet 1
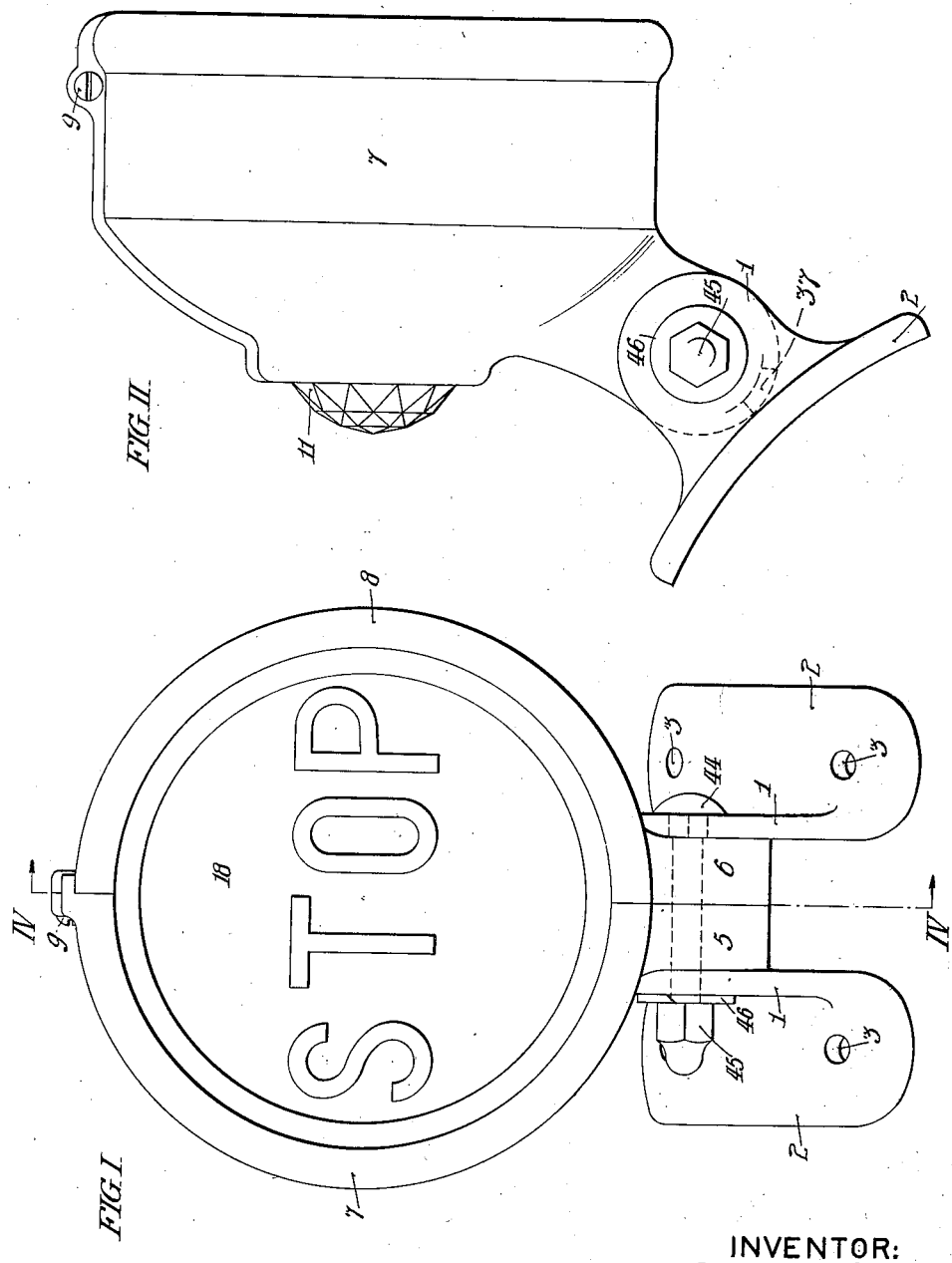
INVENTOR:

Feb. 16, 1926.
E. M. ROSENBLUTH
1,573,578
AUTOMOBILE ACCESSORY
Filed Nov. 22, 1921
6 Sheets-Sheet 2
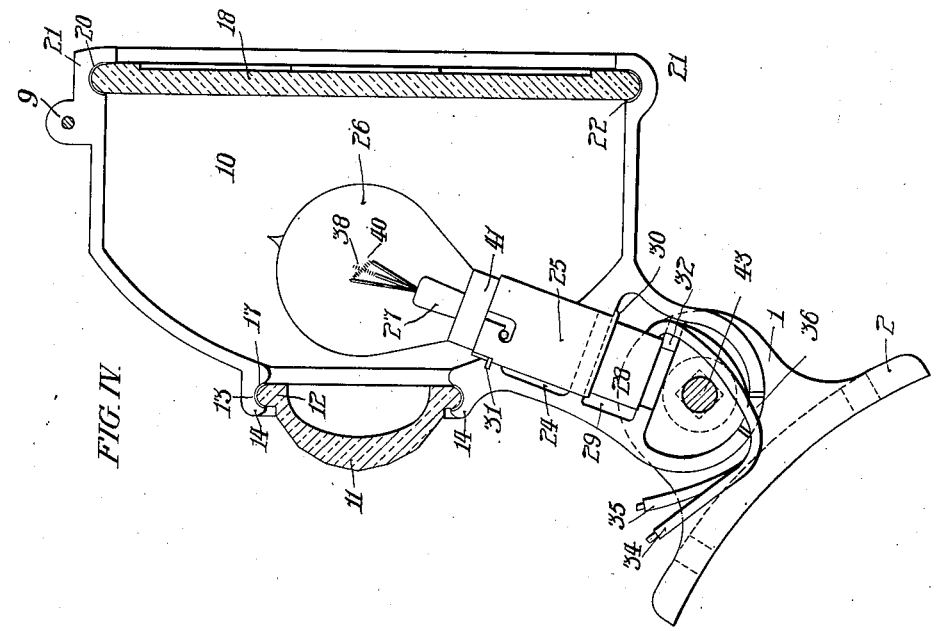
FIG. IV.
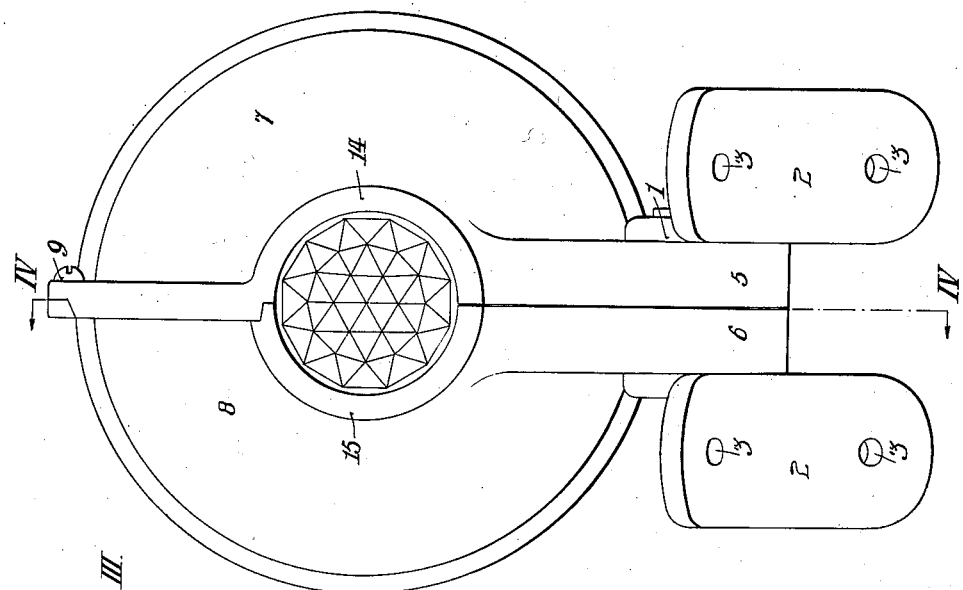
FIG. III.
INVENTOR:
Edwin M. Rosenbluth,
by Arthur E. Paige,
Attorney.

Feb. 16, 1926.  
E. M. ROSENBLUTH  
AUTOMOBILE ACCESSORY  
Filed Nov. 22, 1921
1,573,578
6 Sheets-Sheet 3
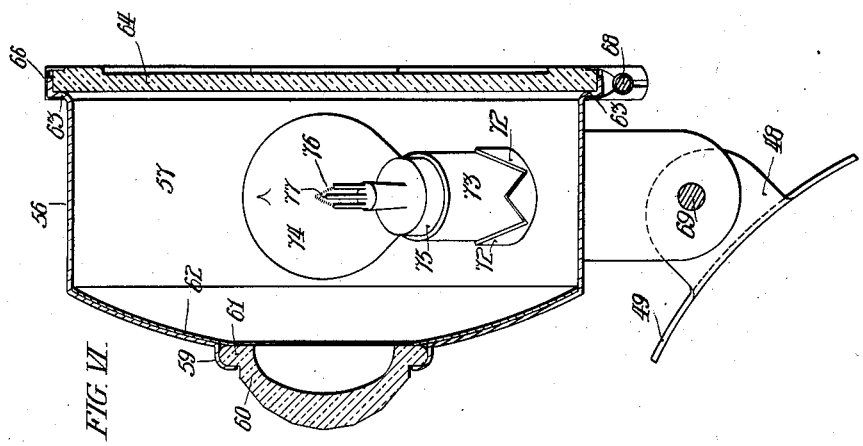
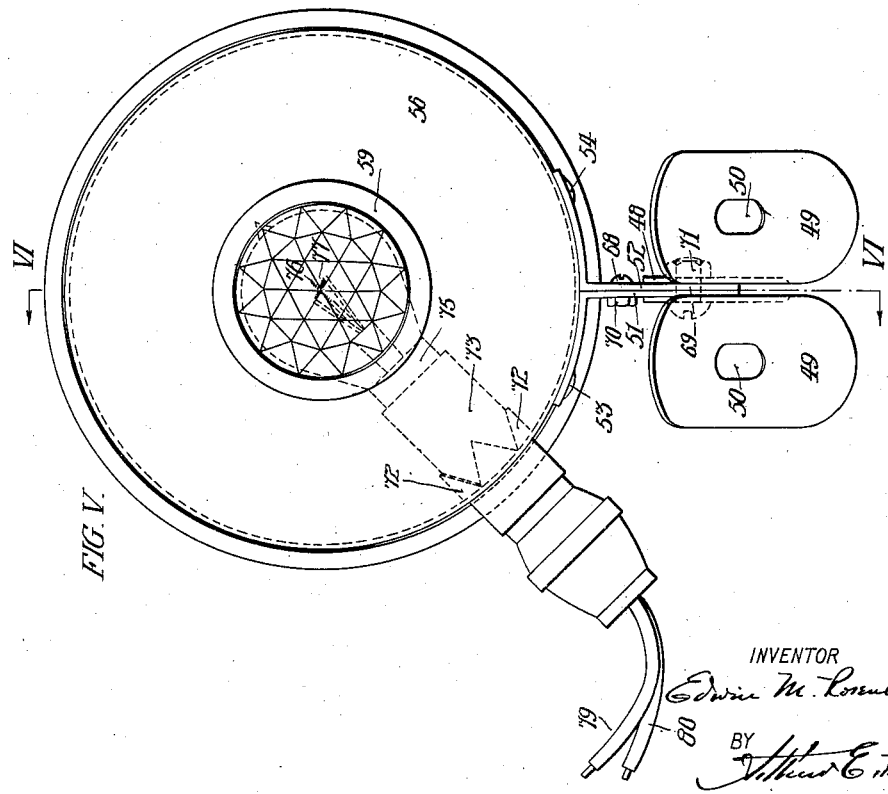

Feb. 16, 1926.
E. M. ROSENBLUTH
1,573,578
AUTOMOBILE ACCESSORY
Filed Nov. 22, 1921
6 Sheets-Sheet 4
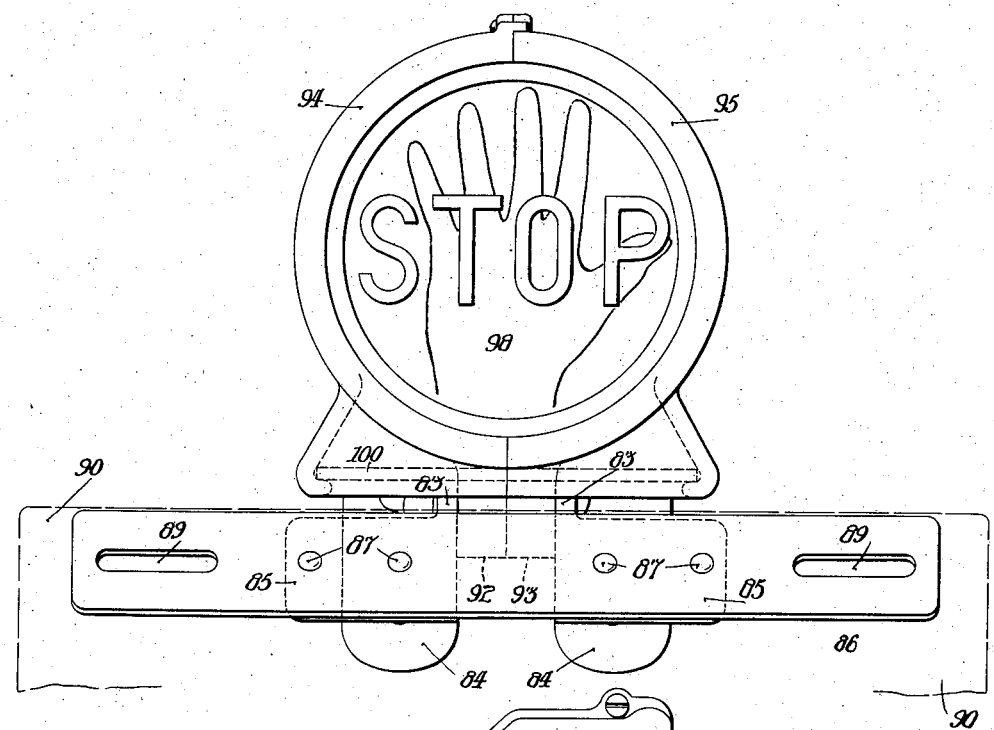
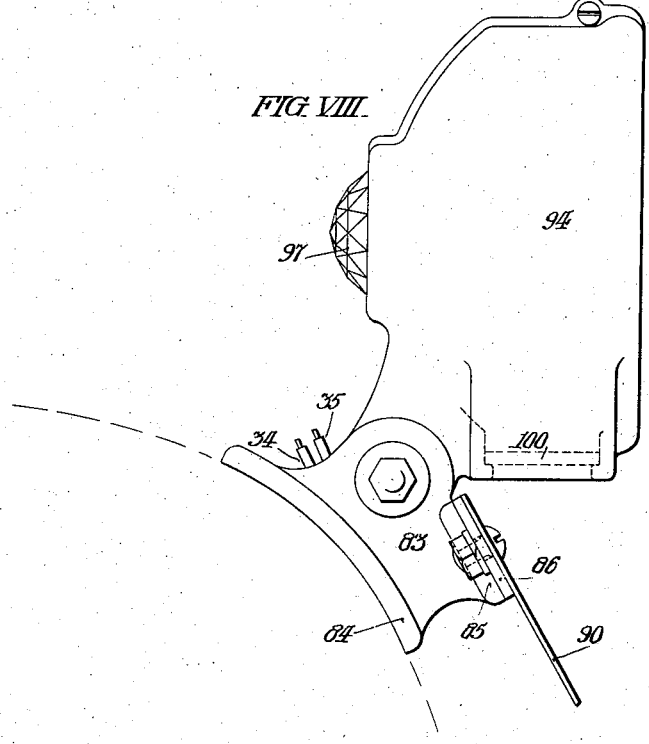
INVENTOR
Edwin M. Rosenbluth,
BY
Arthur E. Craig,
ATTORNEY Feb. 16, 1926.
E. M. ROSENBLUTH
1,573,578
AUTOMOBILE ACCESSORY
Filed Nov. 22, 1921
6 Sheets-Sheet 5
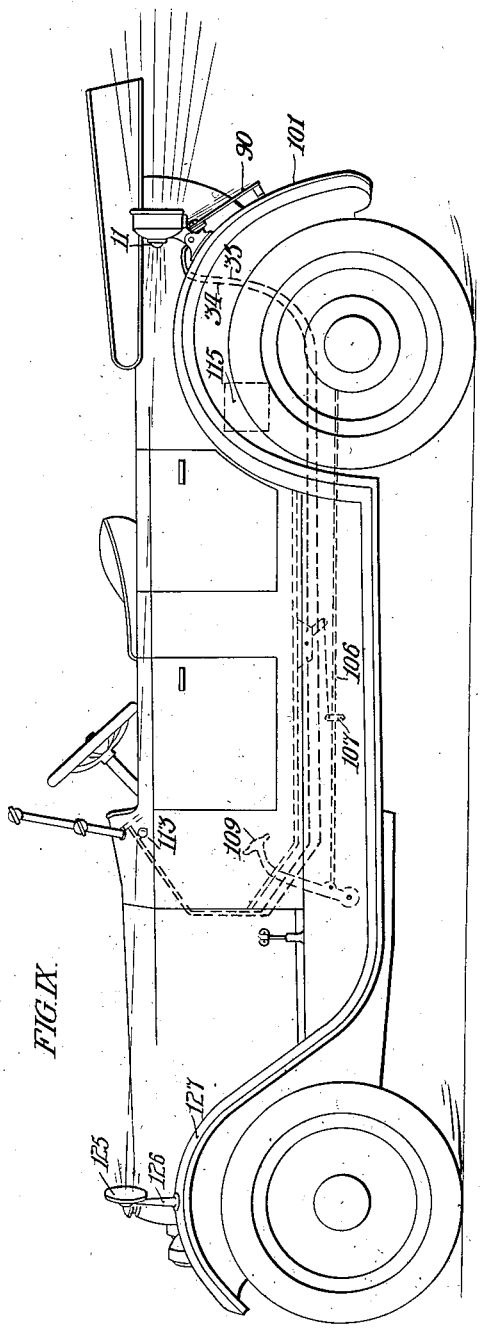
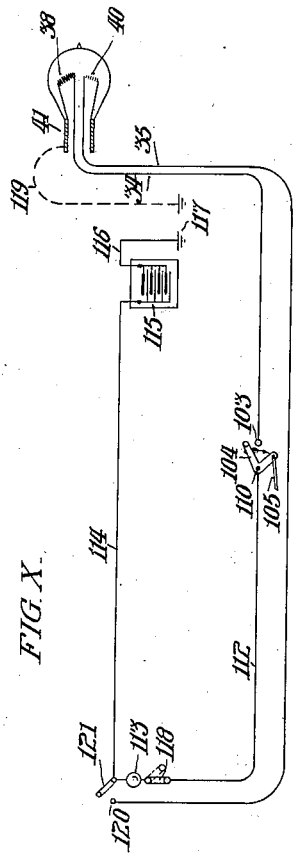
INVENTOR
Edwin M. Rosenbluth
BY
Arthur E. Paige
ATTORNEY Feb. 16, 1926.
E. M. ROSENBLUTH
AUTOMOBILE ACCESSORY
Filed Nov. 22, 1921
1,573,578
6 Sheets-Sheet 6
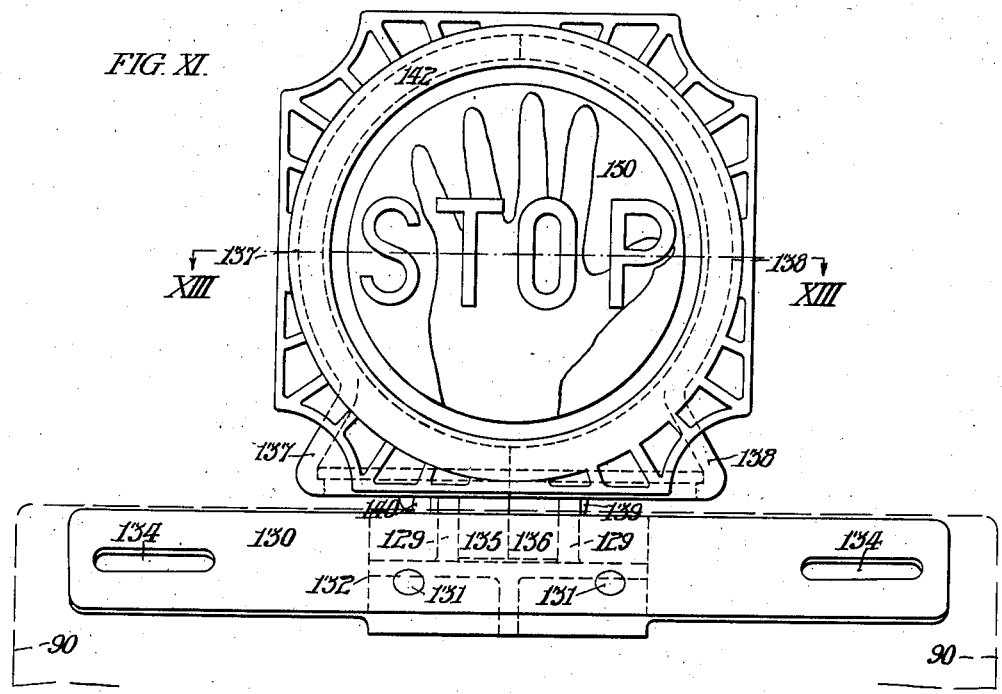
FIG. XI.
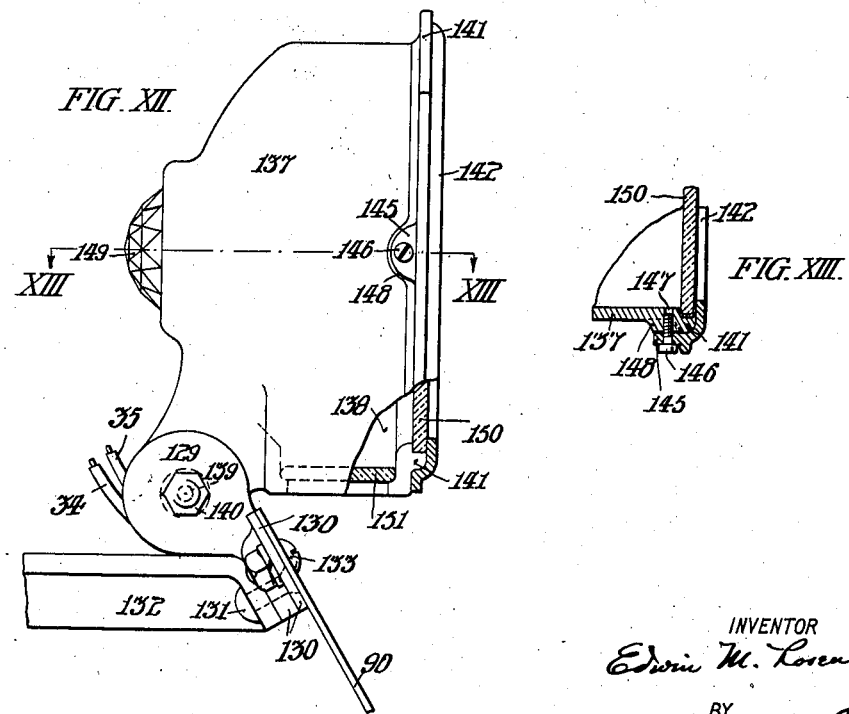
FIG. XII.
FIG. XIII.
INVENTOR
Edwin M. Rosenbluth,
BY
ATTORNEY Patented Feb. 16, 1926.

1,573,578

UNITED STATES PATENT OFFICE.

EDWIN M. ROSENBLUTH, OF WALLINGFORD, PENNSYLVANIA.

AUTOMOBILE ACCESSORY.

Application filed November 22, 1921. Serial No. 516,961.

*To all whom it may concern:*

Be it known that I, EDWIN M. ROSENBLUTH, a citizen of the United States, residing at Wallingford, in the county of Delaware, in the State of Pennsylvania, have invented a certain new and useful Improvement in Automobile Accessories, whereof the following is a specification, reference being had to the accompanying drawings.

My invention relates to signaling devices for automobiles and other vehicles including, in a single casing, means to project a white light forwardly with respect to such a vehicle and a red light rearwardly with respect thereto; said red light being arranged to manifest the word "Stop" or any signal adapted to warn persons at the rear of the vehicle that the latter is about to stop, so as to prevent rear end collisions; said white light being adapted for use as a parking light.

As hereinafter described; my improved lamp structure aforesaid is embodied in an organized signaling system accessory to a vehicle and so constructed and arranged that said stop signal is manifested automatically by energizing a high powered incandescent electric filament in said casing whenever the vehicle operator applies the vehicle braking mechanism; the usual operation of depressing the brake pedal, serving to close an electric circuit connecting that lamp with a source of electric current carried by the vehicle. The lamp bulb containing said high powered filament also contains, in the same vacuum chamber, a low powered incandescent filament which is not energized automatically as above described but is arranged to be energized independently of the brake mechanism and conveniently by means of a push button switch mounted upon the instrument board adjacent the dash of the vehicle. As hereinafter described, I have found it convenient to use a high powered filament of twenty-one candle power, to illuminate said stop signal, whereas, the other filament need not be more than two candle power to afford a satisfactory parking light.

My invention is advantageous in that it provides in a single accessory casing, means to manifest both the high powered stop signal and the low powered parking signal not only with economy of initial cost of apparatus but with economy of the continued cost of electric current to operate the same.

Although I prefer to embody my invention in a signaling system of the complex character above contemplated; such embodiment is not essential, as my improved lamp structure may be utilized otherwise. My invention includes the various novel features of construction and arrangement hereinafter more definitely specified.

In said drawings; Fig. I is a rear elevation of a signaling device embodying a form of my invention including a diametrically divided lamp casing adapted to be made of cast metal and displaying the translucent panel which manifests the stop signal. Fig. II is an elevation of the left hand side of said device as shown in Fig. I. Fig. III is a front elevation of said device, showing the translucent jewel element through which the parking light is projected. Fig. IV is a central vertical sectional view of the structure shown in Figs. I to III inclusive, taken on the line IV, IV in Figs. I and III, in the direction of the arrows marked thereon. Fig. V is a front elevation of a modified form of my invention, including an undivided lamp casing adapted to be made of pressed sheet metal. Fig. VI is a central vertical sectional view of said structure, taken on the line VI, VI in Fig. V, in the direction of the arrows marked thereon. Fig. VII is a rear elevation of a signaling device, including a divided casing, embodying my invention and adapted to not only afford a parking light and a stop signal, but also to illuminate a license number plate. Fig. VIII is an elevation of the left hand side of the structure shown in Fig. VII. Fig. IX is a diagrammatic side elevation of an automobile having applied thereto a signaling system of the complex character above contemplated, embodying a form of my improved lamp structure with means to automatically energize and deenergize said high powered filament, in connection with the vehicle brake mechanism, and means arranged to energize and deenergize the low powered filament aforesaid by manual operation of a switch adjacent the chauffeur's seat. Fig. X is a wiring diagram indicating essential features of said system employed as shown in Fig. IX. Fig. XI is a rear elevation of a signaling device, including a diametrically divided casing, arranged to be held together by an annular escutcheon plate. Fig. XII is a left hand side elevation of said device as shown in Fig. XI, but with a fragment thereof in central vertical section. Fig. XIII is a fragmentary plan sectional view of said device, taken on the line XIII in Figs. XI and XII.

Referring to the form of my invention shown in Figs. I to IV inclusive; the base brackets 1, 1 are of the same configuration and conveniently formed of cast metal having respective base flanges 2 curved to fit the mud guard of the rear left hand wheel of an automobile; said flanges 2 having openings 3 therethrough for screw bolts or rivets whereby said brackets 1, 1 may be held in stationary position upon such guard. As shown in Figs. I and III, said brackets 1 embrace between them the oppositely counterpart lugs 5 and 6 of respective semi-circular castings 7 and 8 which are connected by the screw 9, and which enclose the lamp chamber 10 as indicated in Fig. IV. Said casing members retain the front translucent jewel element 11 by its flange 12 fitting in the circumferential groove 13 in the semi-circular flanges 14 and 15 on said respective casing members 7 and 8. Said flanges 14 and 15 are respectively provided with semi-circular gaskets 17, conveniently formed of textile tape cemented therein and serving as a resilient seat for said flange 12 on said translucent element 11, as shown in Fig. IV. Said translucent element 11, which is designed to transmit a white parking light, is conveniently formed of white opal glass molded as a convex lens with exterior jewel facets.

As also shown in Fig. IV; said casing members 7 and 8 likewise retain the rear translucent member 18 which is adapted to transmit a red light to manifest the word "Stop" indicated thereon in Fig. I, or some other suitable signal.

Said element 18 is fitted in opposite complementary grooves 20 in the semi-circular flanges 21 on said casing members 7 and 8; said grooves having gaskets 22 therein similar to the gaskets 17 aforesaid.

Said pivot lugs 5 and 6 are oppositely counterpart and have respective approximately semi-cylindrical recesses 24 fitted to the cylindrical socket 25 which is adapted to detachably hold the incandescent lamp 26 by its cylindrical plug 41. Said plug may have radial studs adapted to engage bayonet slots in said socket 25, as indicated in Fig. IV. Said socket 25 carries the insulating core 28 which extends into the chamber formed by oppositely counterpart recesses 29 in said lugs 5 and 6, and said socket is held in proper axial position with respect to said casing, by its projections 30 and 31, conveniently formed by slitting and bending the outer metallic shell of said socket 25, engaging said lugs as indicated in Fig. IV, with the outer end of said core 28 resting upon the opposite counterpart flanges 32 in said lugs. The electrical conductors 34 and 35 extend through the opposite counterpart recesses 36 and 37 in said lugs 5 and 6 and through said core 28 in respective connection with the two filaments which are both held in the same vacuum chamber in said lamp bulb 26; said conductor 34, leading to the high powered filament 38 and said conductor 35 leading to the low powered filament 40. The return circuits from each of said filaments 38 and 40 have the common contact 41, conveniently a metallic band encircling said plug 27; said contact 41 being normally in electrical connection with said metallic socket 25 and the latter in electrical connection with said lugs 5 and 6, so that a return circuit may be established through the frame of the automobile as hereinafter described with reference to Fig. IX.

Although said lamp casing above described may be connected with the vehicle in any convenient manner, I prefer to provide means to permit angular adjustment thereof so that the axis of the casing may be set and maintained in substantially horizontal position. As shown in Figs. I to IV inclusive; such means may include the opposite counterpart brackets 1 to which the lamp casing may be rigidly clamped by the pivot bolt 43 which, as indicated in Fig. I, has its head 44 exterior to one of said brackets and the nut 45 engaging said bolt exterior to the other bracket 1. Accidental dislodgment of said nut 45 may be conveniently prevented by the split spring washer 46 interposed between it and the adjacent face of the bracket 1.

Referring to the form of my invention shown in Figs. V and VI; the base brackets 48, are of the same configuration and are conveniently formed of pressed sheet metal having respective base flanges 49 curved to fit the mud guard of the rear left hand wheel of an automobile; said flanges 49 have openings 50 therethrough for screw bolts or rivets whereby said brackets 48 may be held in stationary position upon such guard. As shown in Fig. V, said brackets 48 embrace between them the oppositely counterpart lugs 51 and 52 which are conveniently formed of pressed sheet metal, connected by rivets 53 and 54, with the cylindrical wall of the pressed sheet metal lamp casing 56 which encloses the lamp chamber 57 shown in Fig. VI. Said casing 56 has, at the front thereof, the annular flange 59 forming a seat for the translucent jewel element 60 which is engaged therein by its flange 61 and is retained in the position shown in Fig. VI by the reflector plate 62 which may be held in said casing by frictional engagement with the cylindrical wall thereof, or otherwise. Said translucent element 60 is adapted to transmit a white parking light and is conveniently formed of white opal glass molded as a convex lens with exterior jewel facets.

As shown in Fig. VI; said lamp casing 56 has, at the rear thereof, the annular flange 63 forming a seat for the translucent member 64 which is adapted to transmit a red light to manifest the word "Stop" as indicated in Fig. I or some other suitable signal. Said element 64 is arranged to be detachably held in said seat flange 63 by means of the split annular band 66 which is U-shaped in cross section as indicated at the upper portion of Fig. VI and has its opposite ends turned radially outward and connected by the screw bolt 68 provided with the nut 70 shown in Fig. V. Said band is resilient and may be sprung to and from its position of engagement illustrated.

Said casing 56 is pivotally connected with the stationary supporting brackets 49, by the pivot 69, conveniently formed as a screw and provided with the nut 71 indicated in Fig. V; so that said casing may be set at any desired angle and clamped in rigid relation with the vehicle.

Said casing 56 has an opening punched therein, forming four inwardly projecting tabs 72, adapted to hold the cylindrical incandescent lamp-socket 73, which may be soldered thereto in the position shown in Figs. V and VI. Said socket 73 is adapted to detachably hold the incandescent lamp bulb 74 by its cylindrical plug 75 and incloses, in the same vacuum chamber, the high powered filament 76 and the low powered filament 77; the construction and arrangement being such that said filaments may be respectively energized, as above described, through the conductors 79 and 80 shown in Fig. V.

Referring to the form of my invention shown in Figs. VII and VIII, the base brackets 83 have flanges 84 by which they may be connected with a mud guard as above described, and flanges 85 for connection with a yoke bar 86 to which they may be connected by rivets 87. Said bar has longitudinal slots 89 adapted to register with openings in a license number plate 90 and to receive screw bolts arranged to detachably, rigidly connect such a number plate with said brackets. Said brackets 83 embrace the lugs 92 and 93 of respective semicircular castings 94 and 95, which when fitted together as shown in Fig. VII, are adapted to hold three distinct translucent elements, in cooperative relation with a single electric lamp mounted within said casing, and of the character above described; said translucent elements being respectively adapted to transmit a parking light, a stop signal light and light continuously illuminating a license number plate. Said elements include; first, the front translucent element 97, adapted to transmit a white parking light; second, the rear translucent element 98 adapted to transmit a red light and manifest a "Stop" signal, as in Fig. I, or the outline of an uplifted hand as indicated in Fig. VII, in combination with the word "Stop", or otherwise; and third, the translucent element 100 at the bottom of said casing, adapted to transmit white light upon said number plate 90.

Each form of my invention above described may be embodied in an automobile, or other vehicle, as indicated in Figs. IX and X. For instance, the form shown in Figs. VII and VIII may be mounted upon the mud guard 101 shown in Fig. IX with the number plate 90 connected therewith, as shown in Figs. VII, VIII and IX, and the conductors 34 be included in the system of wiring shown diagrammatically in Fig. X. In such system, the conductor 34 leads to the terminal contact 103 for the automatic switch 104 which is connected by the link 105 with the brake rod 106, conveniently by the clamp 107 indicated in Fig. IX; so that, whenever the brake pedal 109 is thrust forward by the operator, said switch 104 is turned upon its pivot 110 in the direction of the arrow shown in Fig. X, to make contact with said terminal 103 and close the circuit through the conductor 34, conductor 112, indicator lamp 113, which is conveniently mounted on the instrument board in front of the chauffeur's seat, and the conductor 114 leading to the storage battery 115 which is connected by the conductor 116 with the automobile frame, indicated as ground, at 117 in Fig. X; said frame being electrically connected with the contact 41 which is a metallic band encircling the lamp plug as above described. Although such metallic connection between the contact 41 and the automobile frame may be made through the supporting brackets of the lamp structure, it is indicated by the dash line 119 in Fig. X. The effect of those electrical connections is to energize the high powered filament 38, and not only display the stop signal whenever the brake is applied to stop the vehicle, but also energize the indicating lamp 113 so that the operator, in the chauffeur's seat, may know, by reference to said indicator 113, if and whenever the electric circuit is established to energize said high powered filament 38. The inclusion of an indicating element in said circuit is advantageous because it enables the operator to avoid waste of the electric current which would be occasioned if the circuit were allowed to remain closed when the stop signal is not needed. However, as it is sometimes desirable to leave the brakes applied when the stop signal is not needed, I prefer to include in said circuit, and conveniently between the conductor 112 and said indicating signal 113, an auxiliary switch 118, whereby the operator may manually open and close said circuit, including the high powered filament 38, when that circuit is closed by the switch 104 connected with the brake mechanism as above described. However, the normal condition of the circuit including said high powered filament 38 is that indicated in Fig. X, with the said switch 104 open and the filament deenergized. Therefore, I find it convenient to use part of the circuit above described in energizing the low powered filament 40 through the conductor 35, by extending the latter to the contact 120 for the switch 121, which is also conveniently mounted upon the instrument board aforesaid, so that it may be manually closed and opened by the operator. That switch 121 is normally open, as indicated in Fig. X but, when it is closed, the circuit is established from said low powered filament 40, through said conductor 35 and said switch 121 to the conductor 114 aforesaid, so as to establish connection through said battery 115, conductor 116, and the frame of the automobile to said common contact 41, with which the opposite side of said filament 40 is connected as above described. However, said switch 121 is closed whenever it is desired to illuminate said license number plate 90, by said low powered filament 40, without energizing the high powered filament 38; although the latter may be energized and deenergized automatically, in accordance with the operation of the brake mechanism, without interrupting the illumination of said number plate. Of course, in the construction and arrangement shown in Figs. VII, VIII, IX, and X, the illumination of said number plate 90 is augmented by the operation of said high powered filament 38 whenever the brake mechanism is applied, and the stop signal displayed.

Of course, the operator may discover if and when the parking light element 11 is illuminated, by turning around and looking at it. However, I prefer to provide means to enable the operator to determine if and when said element is illuminated, without turning around, and find it convenient to so set the mirror 125, which is angularly adjustable on its standard 126, which is rigidly connected with the front mud guard 127, that said mirror reflects light projected through said element 11, as indicated by the dash line in Fig. IX; so that the operator may see the reflection of said element 11 in said mirror whenever it is illuminated.

Referring to the form of my invention shown in Figs. XI, XII and XIII; the base brackets 129 are in unitary relation with the bar 130 which is adapted to be connected, conveniently by rivets 131, with the projection 132 carried by the vehicle. Said bar 130 has longitudinal slots 134 adapted to register with openings in a license number plate 90 and to receive screw bolts 133 arranged to detachably rigidly connect such a number plate with said bar. Said brackets 129 embrace the lugs 135 and 136 of respective semicircular castings 137 and 138, similar to the casing members 7 and 8 and the casing members 94 and 95 aforesaid. Said casing members are angularly adjustable upon the pivot bolt 139 which is provided with the nut 140 arranged to adjustably clamp them between said brackets 129. However, said casing members 137 and 138 are without the overlapping interlocking flanges at the top thereof which, in Figs. I to IV inclusive are connected by the screw 9. In the form of my invention shown in Figs. XI to XIII inclusive I provide said casing sections 137 and 138 with a smoothly continuous annular rim 141 to detachably fit within the annular escutcheon plate 142, whereby said sections are held together; said plate 142 having diametrically opposite flange lugs 145 to receive respective screws 146 which may be engaged in threaded openings 147 in said casing sections 137 and 138, as indicated in Fig. XIII; said sections being reinforced, around said openings 147, by bosess 148. However, it is to be understood that set screws may be substituted for said screws 146, to merely bear upon the outer surface of said respective casing members 137 and 138 to retain said plate 142 thereon, or said annular element 142 may be otherwise secured.

Said casing members 137 and 138 are adapted to hold three distinct translucent elements, in cooperative relation with a source of light, arranged within said casing as above described or otherwise; the front translucent member 149 being adapted to transmit a white parking light; the rear translucent element 150 being adapted to transmit a red light, and manifest a stop signal as shown in Fig. XI; and the translucent element 151, at the bottom of said casing, being adapted to transmit a white light upon said number plate 90.

It is to be understood that signaling devices including sectorally sectional casings of the type shown in Figs. XI to XIII inclusive may be caused to present distinctively different appearances in accordance with variations in the configuration of annular elements, such as 142, which may be interchangeably connected therewith; so that my invention may be applied to different standard makes of automobiles with respectively different distinctive appearances thereon.

However, it may be observed that, regardless of the differences in specific construction and arrangement of the several forms of my invention above described, each includes a high powered filament and a low powered filament which may be alternately electrically energized to manifest a stop signal with maximum illumination and manifest a parking signal with minimum expenditure of current. Although it is less costly to include both of said filaments in a single vacuum chamber, they may be otherwise disposed. Moreover, it may be observed that the advantages of forming a lamp casing of semi-annular or other sectoral sections, separable on substantially radial lines, in facilitating and lessening the cost of manufacture thereof are independent of the specific means for assembling such sections in cooperative relation.

Therefore, I do not desire to limit myself to the precise details of construction and arrangement herein set forth, as it is obvious that various modifications may be made therein, without departing from the essential features of my invention, as defined in the appended claims.

I claim:

1. The combination with a lamp casing formed of complementary, substantially semicircular sections, having complementary seats for a translucent element; of an annular plate detachably fitted to said casing, and including means arranged to retain said translucent member therein and having means arranged to clamp it on said casing, including flanges on said plate and screws extending transversely through said flanges, in transverse relation to the axis of said casing.

2. The combination with a lamp casing formed of complementary, substantially semiannular sections; of an annular plate detachably fitted to said casing, and including means arranged to clamp it on said casing, including flanges on said plate and screws extending transversely through said flanges, in transverse relation to the axis of said casing.

3. The combination with a lamp casing formed of complementary, substantially semiannular sections; of an annular plate detachably fitted to said casing, and including means arranged to clamp it on said casing.

4. The combination with a lamp casing formed of complementary, sectoral sections, having complementary seats for a translucent element; of an annular plate detachably fitted to said casing, and including means arranged to retain said translucent member therein and having means arranged to clamp it on said casing.

5. The combination with a lamp casing formed of complementary, sectoral sections; of an annular plate detachably fitted to said casing, and including means arranged to retain a translucent member therein and having means arranged to clamp it on said casing.

6. The combination with a lamp casing formed of complementary sectoral sections, having complementary seats arranged to hold a translucent element extending transversely across the axis of said casing, and having complementary seats for a translucent element extending parallel with the axis of said casing; and an annular plate detachably fitted to said casing, and arranged to retain said translucent members therein and having means arranged to detachably secure it on said casing.

7. The combination with a lamp casing formed of complementary, substantially semiannular, sections, having respective hollow and complementary pivot lugs in eccentric relation with said casing and having coaxial pivot seats in the respective lugs; of means arranged to hold said sections together, including a plate, extending exterior to said casing.

8. The combination with a lamp casing formed of complementary, substantially semiannular, sections, having respective hollow and complementary pivot lugs in eccentric relation with said casing and having coaxial pivot seats in the respective lugs; of means arranged to hold said sections together, including a plate, extending exterior to said casing, forming a pivotal support and having a pivot member extending through said lugs and provided with means to clamp said casing in angularly adjustable relation with its pivotal support.

9. The combination with a lamp casing formed of complementary, substantially semicicular, sections, having complementary seats for a translucent element; of means arranged to detachably hold said sections together and retain said translucent member therein, including a pivot member adjustable to hold said casing in variable angular positions.

In testimony whereof, I have hereunto signed my name at Philadelphia, Pennsylvania, this nineteenth day of November, 1921.

EDWIN M. ROSENBLUTH.